United States Patent
Garahi et al.

(10) Patent No.: US 7,454,380 B2
(45) Date of Patent: Nov. 18, 2008

(54) SYSTEMS AND METHODS FOR PLACING PARIMUTUEL WAGERS ON FUTURE EVENTS

(75) Inventors: Masood Garahi, Superior, CO (US); John Hindman, Los Angeles, CA (US); Connie T. Marshall, Muskogee, OK (US); Richard E. McNutt, Lafayette, CO (US); James D. Oldham, Denver, CO (US); Douglas V. Ramsey, Louisville, CO (US); Eric F. Stimmel, Louisville, CO (US); Jay D. Thomas, Denver, CO (US); William L. Thomas, Bixby, OK (US)

(73) Assignee: ODS Properties, Inc., Los Angeles, CA (US)

( * ) Notice: Subject to any disclaimer, the term of this patent is extended or adjusted under 35 U.S.C. 154(b) by 1442 days.

(21) Appl. No.: 09/825,537

(22) Filed: Apr. 2, 2001

(65) Prior Publication Data

US 2001/0047291 A1 Nov. 29, 2001

Related U.S. Application Data

(60) Provisional application No. 60/194,799, filed on Apr. 5, 2000.

(51) Int. Cl.
*G06Q 30/00* (2006.01)

(52) U.S. Cl. .............................. 705/37; 705/26; 705/27; 705/37; 463/16; 463/22; 463/25; 463/26; 463/40; 463/42

(58) Field of Classification Search .................. 705/26, 705/27, 37; 463/16, 22, 25, 28, 40, 42, 26
See application file for complete search history.

(56) References Cited

U.S. PATENT DOCUMENTS 3,909,002 A 9/1975 Levy ...................... 273/138 A (Continued)

FOREIGN PATENT DOCUMENTS

EP 0 387 046 A2 9/1990

(Continued)

OTHER PUBLICATIONS

Daley, "Easy Goer No. 1 choice in Vegas", Telegram & Gazette, Oct. 20, 1989, p. B5.*

(Continued)

*Primary Examiner*—Nga B. Nguyen
(74) *Attorney, Agent, or Firm*—Matthew S. Bertenthal; James A. Leiz; Ropes & Gray LLP

(57) ABSTRACT

An interactive wagering application is provided that allows users to place parimutuel wagers on future events. An interactive wagering system may enable the user to place a wager on the future event by providing multiple wagering pools. When a future event wagering pool is closed, final odds and payouts may be determined for that wagering pool and a new wagering pool, for the same future event, may be made available. The interactive wagering application may also monitor the user's activities to create a user profile. The interactive wagering application may use the user profile to find future race events that may be of interest to the user. The interactive wagering application may also provide the user with the ability to search for future races according to the future race date, race name, or any other suitable criteria.

32 Claims, 16 Drawing Sheets

U.S. PATENT DOCUMENTS

| | | | |
|---|---|---|---|
| 4,001,551 A | 1/1977 | Hirsimaki | |
| 4,033,588 A | 7/1977 | Watts | 273/138 A |
| 4,108,361 A | 8/1978 | Krause | 235/375 |
| 4,322,612 A | 3/1982 | Lange | 235/419 |
| 4,339,798 A | 7/1982 | Hedges et al. | 364/412 |
| 4,372,558 A | 2/1983 | Shimamoto et al. | 273/238 |
| 4,494,197 A | 1/1985 | Troy et al. | 364/412 |
| 4,593,904 A | 6/1986 | Graves | 273/1 E |
| 4,636,951 A | 1/1987 | Harlick | 364/412 |
| 4,652,998 A | 3/1987 | Koza et al. | 364/412 |
| 4,689,742 A | 8/1987 | Troy et al. | 364/412 |
| 4,694,490 A | 9/1987 | Harvey et al. | 380/234 |
| 4,704,725 A | 11/1987 | Harvey et al. | 380/9 |
| 4,706,121 A | 11/1987 | Young | 358/142 |
| 4,745,468 A | 5/1988 | Von Kohorn | 358/84 |
| 4,747,600 A | 5/1988 | Richardson | 273/269 |
| 4,760,527 A | 7/1988 | Sidley | 364/412 |
| 4,764,666 A | 8/1988 | Bergeron | 235/380 |
| 4,799,683 A | 1/1989 | Bruner, Jr. | 273/138 A |
| 4,815,741 A | 3/1989 | Small | 273/138 A |
| 4,842,278 A | 6/1989 | Markowicz | |
| 4,882,473 A | 11/1989 | Bergeron et al. | 235/380 |
| 4,922,522 A | 5/1990 | Scanlon | 379/95 |
| 4,926,255 A | 5/1990 | Von Kohorn | 358/84 |
| 4,926,327 A | 5/1990 | Sidley | 364/412 |
| 4,965,825 A | 10/1990 | Harvey et al. | 380/233 |
| 4,969,183 A | 11/1990 | Reese | 379/88 |
| 4,996,705 A | 2/1991 | Entenmann et al. | 379/91 |
| 5,007,649 A | 4/1991 | Richardson | 273/237 |
| 5,034,807 A | 7/1991 | Von Kohorn | 358/84 |
| 5,054,787 A | 10/1991 | Richardson | 273/369 |
| 5,057,915 A | 10/1991 | Von Kohorn | 358/84 |
| 5,083,271 A | 1/1992 | Thacher et al. | 364/411 |
| 5,083,272 A | 1/1992 | Walker et al. | 364/412 |
| 5,083,800 A | 1/1992 | Lockton | 273/439 |
| 5,096,195 A | 3/1992 | Gimmon | 273/138 |
| 5,096,202 A | 3/1992 | Hesland | 273/237 |
| 5,112,050 A | 5/1992 | Koza et al. | 273/139 |
| 5,119,295 A | 6/1992 | Kapur | 364/412 |
| 5,178,389 A | 1/1993 | Bentley et al. | 273/138 |
| 5,186,471 A | 2/1993 | Vancraeynest | 273/439 |
| 5,218,631 A | 6/1993 | Katz | 463/41 |
| 5,227,874 A | 7/1993 | Von Kohorn | 358/84 |
| 5,233,654 A | 8/1993 | Harvey et al. | 380/20 |
| 5,249,044 A | 9/1993 | Von Kohorn | 358/86 |
| 5,276,312 A | 1/1994 | McCarthy | 235/380 |
| 5,280,426 A | 1/1994 | Edmonds | 364/408 |
| 5,280,915 A | 1/1994 | Groussman | |
| 5,282,620 A | 2/1994 | Keesee | 273/138 |
| 5,283,734 A | 2/1994 | Von Kohorn | 364/412 |
| 5,286,023 A | 2/1994 | Wood | 273/138 |
| 5,297,802 A | 3/1994 | Pocock et al. | 273/439 |
| 5,326,104 A | 7/1994 | Pease et al. | 273/138 |
| 5,327,485 A | 7/1994 | Leaden | 379/95 |
| 5,333,868 A | 8/1994 | Goldfarb | 273/138 |
| 5,340,119 A | 8/1994 | Goldfarb | 273/439 |
| 5,351,970 A | 10/1994 | Fioretti | 273/439 |
| 5,354,069 A | 10/1994 | Guttman et al. | 273/439 |
| 5,365,575 A | 11/1994 | Katz | 379/92 |
| 5,398,932 A | 3/1995 | Eberhardt et al. | 273/138 |
| 5,403,999 A | 4/1995 | Entenmann et al. | 235/379 |
| 5,408,417 A | 4/1995 | Wilder | 364/479 |
| 5,415,416 A | 5/1995 | Scagnelli et al. | 273/439 |
| 5,417,424 A | 5/1995 | Snowden et al. | 273/138 |
| 5,459,306 A | 10/1995 | Stein et al. | 235/383 |
| 5,505,449 A | 4/1996 | Eberhardt et al. | 273/138 |
| 5,507,489 A | 4/1996 | Reibel et al. | 273/138 |
| 5,518,253 A | 5/1996 | Pocock et al. | 273/439 |
| 5,535,321 A | 7/1996 | Massaro et al. | 345/707 |
| 5,539,450 A | 7/1996 | Handelman | 348/12 |
| 5,539,822 A | 7/1996 | Lett | 380/20 |
| 5,545,088 A | 8/1996 | Kravitz et al. | 463/40 |
| 5,564,977 A | 10/1996 | Algie | 463/25 |
| 5,569,083 A | 10/1996 | Fioretti | 463/19 |
| 5,573,244 A | 11/1996 | Mindes | 463/26 |
| 5,575,474 A | 11/1996 | Rossides | 463/26 |
| 5,577,727 A | 11/1996 | Brame et al. | 273/139 |
| 5,586,937 A | 12/1996 | Menashe | 463/41 |
| 5,608,785 A | 3/1997 | Kasday | 379/90 |
| 5,643,088 A | 7/1997 | Vaughn et al. | 463/40 |
| 5,647,795 A | 7/1997 | Stanton | 463/1 |
| 5,679,077 A | 10/1997 | Pocock et al. | 463/19 |
| 5,683,090 A | 11/1997 | Zeile et al. | 273/269 |
| 5,687,968 A | 11/1997 | Tarantino | 273/139 |
| 5,688,174 A | 11/1997 | Kennedy | 463/37 |
| 5,713,795 A | 2/1998 | Kohorn | 463/17 |
| 5,722,890 A | 3/1998 | Libby et al. | 463/17 |
| 5,724,521 A | 3/1998 | Dedrick | 395/226 |
| 5,729,212 A | 3/1998 | Martin | 340/870.28 |
| 5,746,657 A | 5/1998 | Ueno | 463/41 |
| 5,749,785 A | 5/1998 | Rossides | 463/25 |
| 5,755,621 A | 5/1998 | Marks et al. | 463/42 |
| 5,758,328 A | 5/1998 | Giovannoli | |
| 5,759,101 A | 6/1998 | Von Kohorn | 463/40 |
| 5,762,552 A | 6/1998 | Vuong et al. | 463/25 |
| 5,772,511 A | 6/1998 | Smeltzer | 463/17 |
| 5,787,156 A | 7/1998 | Katz | 379/93.13 |
| 5,800,268 A | 9/1998 | Molnick | 463/40 |
| 5,816,917 A | 10/1998 | Kelmer et al. | 463/16 |
| 5,816,919 A | 10/1998 | Scagnelli et al. | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,830,069 A | 11/1998 | Soltesz et al. | 463/42 |
| 5,842,921 A * | 12/1998 | Mindes et al. | 463/16 |
| 5,851,149 A | 12/1998 | Xidos et al. | |
| 5,871,398 A | 2/1999 | Schneier et al. | 463/16 |
| 5,910,047 A | 6/1999 | Scagnelli et al. | 463/17 |
| 5,954,582 A | 9/1999 | Zach | 463/25 |
| 5,991,735 A | 11/1999 | Gerace | 705/10 |
| 5,999,808 A | 12/1999 | LaDue | 455/412 |
| 6,001,016 A | 12/1999 | Walker et al. | 463/42 |
| 6,007,426 A | 12/1999 | Kelly et al. | 463/16 |
| 6,024,640 A | 2/2000 | Walker et al. | 463/17 |
| 6,024,641 A | 2/2000 | Sarno | 463/17 |
| 6,030,288 A | 2/2000 | Davis et al. | 463/29 |
| 6,080,062 A | 6/2000 | Olson | 463/42 |
| 6,080,063 A | 6/2000 | Khosla | 463/42 |
| 6,099,408 A | 8/2000 | Schneier et al. | 463/29 |
| 6,102,797 A | 8/2000 | Kail | 463/16 |
| 6,117,011 A | 9/2000 | Lvov | 463/25 |
| 6,117,013 A | 9/2000 | Eiba | 463/41 |
| 6,152,822 A * | 11/2000 | Herbert | 463/22 |
| 6,152,824 A | 11/2000 | Rothschild et al. | 463/42 |
| 6,186,892 B1 | 2/2001 | Frank et al. | 463/19 |
| 6,203,427 B1 | 3/2001 | Walker et al. | 463/16 |
| 6,251,016 B1 | 6/2001 | Tsuda et al. | 463/42 |
| 6,251,017 B1 | 6/2001 | Leason et al. | 463/42 |
| 6,254,480 B1 | 7/2001 | Zach | 463/17 |
| 6,257,982 B1 | 7/2001 | Rider et al. | 463/31 |
| 6,263,054 B1 | 7/2001 | Haefliger | 379/93.13 |
| 6,264,560 B1 | 7/2001 | Goldberg et al. | 463/42 |
| 6,272,223 B1 | 8/2001 | Carlson | 380/251 |
| 6,273,820 B1 | 8/2001 | Haste, III | 463/40 |
| 6,320,868 B1 | 11/2001 | Okano et al. | |
| 6,450,887 B1 * | 9/2002 | Mir et al. | 463/42 |
| 6,631,356 B1 * | 10/2003 | Van Horn et al. | 705/26 |
| 6,722,980 B2 | 4/2004 | Stronach | |
| 2001/0003099 A1 | 6/2001 | Von Kohorn | 463/40 |
| 2001/0003100 A1 | 6/2001 | Yacenda | 463/41 |

FOREIGN PATENT DOCUMENTS

| | | |
|---|---|---|
| EP | 0 583 196 A1 | 2/1994 |

| | | |
|---|---|---|
| EP | 0 620 688 A2 | 10/1994 |
| EP | 0 624 039 A2 | 11/1994 |
| EP | 0 673 004 A2 | 9/1995 |
| EP | 0 873 727 A1 | 10/1998 |
| EP | 0 934 765 A1 | 8/1999 |
| GB | 2180675 A | 4/1987 |
| GB | 2 300 535 A | 11/1996 |
| JP | 01-25659 | 1/1989 |
| JP | 01-269157 | 10/1989 |
| JP | 02-110660 | 4/1990 |
| JP | 02-231671 | 9/1990 |
| JP | 06-325062 | 11/1994 |
| NZ | 272983 | 2/1997 |
| WO | WO 95/01058 | 1/1995 |
| WO | WO 95/22883 | 8/1995 |
| WO | WO 95/30944 | 11/1995 |
| WO | WO 97/01145 | 1/1997 |
| WO | WO 97/09699 | 3/1997 |
| WO | WO 97/19428 | 5/1997 |
| WO | WO 97/28636 | 8/1997 |
| WO | WO 97/44750 | 11/1997 |
| WO | WO 98/21877 | 5/1998 |
| WO | WO 99/04568 | 1/1999 |
| WO | WO 00/67215 | 11/2000 |
| WO | WO 00/77752 | 12/2000 |

OTHER PUBLICATIONS

Gray, "Racing Beat; Mass. turns back on Future-Wage defies 36-houur statute", Boston Herald, Feb. 3, 2000, p. 077.*
O'Donnell, "It's another pool party", Chicago Sun-Times, Mar. 10, 2000, p. 128.*
"Kentucky Derby wageing starts at Lincoln", The Providence Journal, Feb. 18, 2000, p. D07.*
"Early Birds Can Catch big Cash On The Derby", Pittssburgh Post-Gazette, Mar. 5, 2000, p. D.18.*
"Autotote and Arena Leisure Announce Jount Venture for Interent Wagering", PR Newswire, Feb. 9, 2000, p. 1.*
"TRC Thoroughbred Notebook", www.webcom/alauck/trc/trc00/trc0217.html, Feb. 17, 2000, printed on Mar. 3, 2006.
John Scarne, "Scarne's New Complete Guide to Gambling," 1974, pp. 32-108.
You Bet Help File, Youbet.com, Inc., Los Angeles, California, last modified Jul. 11, 1998, pp. 1-132.
Maury Wolff, "Interactive Wagering A Good Bet, " Daily Racing Form, Jan. 29, 1995, p. 4.
John Burgers, "And We're Off To The Races!" The Washington Post, Jan. 16, 1995, pp. 18-19.
Ross Peddicord, "New On TV: You Bet Your Horse," The Sun, Baltimore, Maryland, Dec. 15, 1994.
Yee-Hsiang Chang et al., "An Open-Systems Approach To Video On Demand, " IEEE Communications Magazine, May 1994, pp. 68-80.
TrackMaster User's Guide Version 2.0.7, Apr., 1994, AXCIS Pocket Information Network, Inc., Santa Clara, California, pp. 1-122.
Tiny Tim Brochure, Auto Tote Systems Inc., Newark, Delaware (undated).
Probe XL Brochure, AutoTote Systems, Inc., Newark, Delaware (undated).
US 5,823,877, 10/1998, Scagnelli et al. (withdrawn)

* cited by examiner

1200

|  | MESSAGE BOARD | DEC. 12, 2000 10:00 A |
|---|---|---|
|  |  | MAIN MENU |

FUTURE RACES 1200

| RACETRACK | DATE | RACE # | WAGERING POOLS | | PREV. POOLS |
|---|---|---|---|---|---|
|  |  |  | OPEN | CLOSE |  |
| GULFSTREAM | 12/16/00 | 1 | 12/13 9:00 A | 12/14 5:00 P | AVAILABLE |
| AQUEDUCT | 12/16/00 | 2 | 12/13 10:00 A | 12/14 10:00 A | NONE AVAILABLE |
| GULFSTREAM | 12/16/00 | 5 | 12/14 10:00 A | 12/15 10:00 A | NONE AVAILABLE |
| DEL MAR | 1/30/01 | 2 | 12/30 9:00 A | 12/31 2:00 P | AVAILABLE |

SYSTEMS AND METHODS FOR PLACING PARIMUTUEL WAGERS ON FUTURE EVENTS

CROSS REFERENCE TO RELATED APPLICATIONS

This application claims the benefit of U.S. provisional application No. 60/194,799, filed Apr. 5, 2000, which is hereby incorporated by reference herein in its entirety.

BACKGROUND OF THE INVENTION

The present invention relates to systems and methods for placing parimutuel wagers on future events. More particularly, the present invention is systems and methods for providing multiple wagering pools for each future event in which wagerers may place parimutuel wagers.

Parimutuel wagering, such as wagering on horse racing in the United States, is a very popular activity. Parimutuel wagering typically involves receiving wagers from wagerers, creating wagering pools for each type of wager, deducting a percentage of the wager pools to cover transaction fees, racetrack fees, and the like, and paying out the remainder of the wagering pools as winnings based upon the wager amounts and wager types placed on each runner. Because wagers are effectively placed against other wagerers, rather than against a "house", parimutuel wagering has gained wide-spread acceptance.

When making a parimutuel wager on an event, the wagerer typically places the wager in person at the track, at an off track betting establishment, or at home using a set-top box, a telephone, a computer, or any other suitable device that provides access just prior to the race. For example, a wagerer may place a wager at any time from when the track opens on race day up until the post time for the race. During that time, a parimutuel wagering pool for the race is open for accepting wagers and odds and payouts are calculated. When the time to place wagers has expired, the odds and payouts for the race becomes fixed.

Frequently it is desirable to be able to place a wager on an event well in advance of the event. For example, a wagerer may desire to place a wager on the Kentucky Derby two weeks before the race. Prior to the present invention, it has not been possible to place parimutuel wagers on events far in the future. Wagerers may not be drawn to placing wagers on events far in the future because odds can drastically change as a result of the number of additional wagers that may be placed in the extended period of time available for placing wagers. Rather, it has only been possible to place fixed-odds wagers on such races through sports books, such as those found in casinos in Las Vegas, Nev.

Because fixed-odds wagering is against the law in many states, whereas parimutuel wagering is not, it is desirable to be able to place parimutuel wagers well in advance of future events.

In view of the foregoing, it is an object of the present invention to provide systems and methods for placing parimutuel wagers on future events.

It is a more particular object of the present invention to provide systems and methods for placing parimutuel wagers on future events while reducing the likelihood of the odds from changing too drastically.

SUMMARY OF THE INVENTION

These and other objects of the invention are accomplished in accordance with the principles of the present invention by providing an interactive wagering system in which an interactive wagering application allows a user to place parimutuel wagers on future events.

The interactive wagering system may enable the user to place a wager on a future event by providing multiple wagering pools. The interactive wagering application may provide the user with the ability to place a wager in a first wagering pool for the event. When the first wagering pool is open, odds and payouts are calculated in the traditional manner of a parimutuel wager. When the wagering pool closes, the odds and payouts for that particular wagering pool may become fixed. The interactive wagering application may provide the user with the ability to place a wager in a second wagering pool for the same event. The second wagering pool may open when the first wagering pool closes, while the first wagering pool is open, or at some time after the first wagering pool closes.

The interactive wagering application may provide the user with the ability to view information on previous wagering pools that have closed for a race. The interactive wagering application may provide the user with this ability while the user is creating a wager for that race or at any other suitable time. The previous wagering pool information may include the final odds, pool size, or any other suitable information related to the race and the previous pools.

The interactive wagering application may also monitor the user's activities to create a user profile. The interactive wagering application may use the user profile to find future race events that may be of interest to the user. The user may be notified when the interactive wagering application finds a future race that may be of interest to the user. The interactive wagering application may provide the user with the ability to view the races that may be of interest in a display screen, overlay, or in any other suitable manner.

The interactive wagering application may also provide the user with the ability to search for future races according to the future race date, race name, or any other suitable search criteria.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 12 is an illustrative message board display screen that may be provided in accordance with one embodiment of the present invention.

DETAILED DESCRIPTION OF THE PREFERRED EMBODIMENTS

Figure 1:
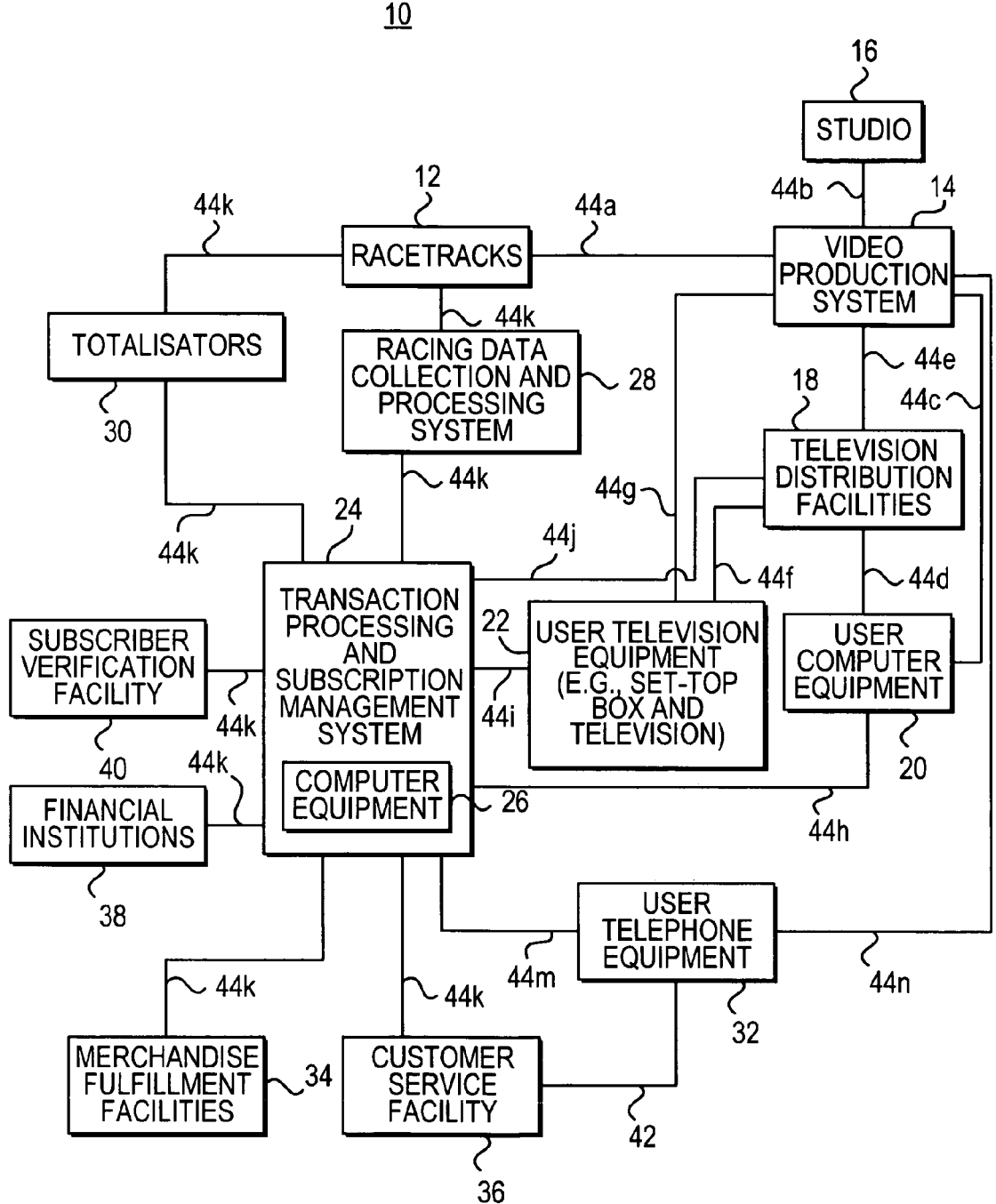
FIG. 1 is a schematic diagram of an illustrative interactive wagering system in accordance with one embodiment of the present invention.

An illustrative interactive wagering system 10 in accordance with the present invention is shown in FIG. 1. Aspects of the invention apply to various different types of wagering, but are described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

System 10 may be used to provide an interactive wagering service to users of various user equipment. An interactive wagering application may be used to provide the wagering service. The interactive wagering application may run locally on the user equipment (e.g., on a set-top box, personal computer, cellular telephone, handheld computing device, etc.) or may run using a client-server or distributed architecture where some of the application is implemented locally on the user equipment in the form of a client process and some of the application is implemented at a remote location (e.g., on a server computer or other such equipment in the system) as a server process. These arrangements are merely illustrative. Other suitable techniques for implementing the interactive wagering application may be used if desired.

Real-time videos from racetracks 12 may also be provided to video production system 14 for distribution to users as part of a television wagering service (i.e., a wagering-related television channel or Internet-delivered service or the like) or an interactive race simulation service (i.e., a race simulating application). If desired, multiple simulcast videos may be provided to video production system 14 in real-time. Talent (e.g., commentators) for the television wagering service provided by the interactive wagering application may be located at studio 16. Studio 16 may provide a video feed containing commentary and the like to video production system 14. Graphic overlays for the television wagering service may be added to the service at video production system 14.

The television wagering service may use video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 16 by a cable path. A digital set-top box may be used to receive the television wagering service on a digital channel. If desired, user television equipment 22 may contain a satellite receiver, an internet enabled set-top box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real-time. Video clips may also be stored for later viewing. For example, one or more video servers located at racetracks 12, video production system 14, television distribution facilities 18, or other suitable locations may be used to store video clips. The stored videos may then be played back in real-time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real-time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and wagering pool totals for each horse or other runner, and exacta, trifecta, and quinella payoff predictions and wagering pool totals for every possible combination of runners. Totalisators 30 may also provide current odds and other real-time racing data for other types of wagers. Totalisators 30 may provide the time until post time for each race.

Totalisators 30 may also handle wagers other than parimutuel wagers. For example, totalisators 30 may handle fixed-odds wagering, handicap wagering, etc. In another suitable embodiment, computer systems separate from totalisators 30 may be used to handle the wagers.

In accordance with the present invention, totalisators 30 may run more than one wagering pool for each race and wager type. In one suitable approach, when one wagering pool for a race closes, another wagering pool for that race may open. For example, there may be seven wagering pools available for one type of wager for a race. The first wagering pool may open six days prior to the race and close at the end of that day. The second wager type may open five days prior to the race and close at the end of that day. This pattern may continue until the seventh wagering pool opens on the day of the race. In another suitable approach, the wagering pools for one type of wager for a race may overlap. This may result in more than one wagering pool to be open at the same time. When there is more than one wagering pool for a type of wager for a race, totalisators 30 may provide the final odds and payout information for the previously closed wagering pools.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system if desired.

Transaction processing and subscription management system 24 may provide the racing data to users at user television equipment 22, user computer equipment 20, and user telephone equipment 32 for use in following race results and developing wagers. In one suitable approach, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones or other telephones with displays. Users may view racing data and videos displayed on such displays.

Users who wish to place wagers may establish an account at transaction processing and subscription management system 24. An account may also be established at one of totalisators 30. The user and the interactive wagering services may have their own bank accounts at financial institutions 38. The user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the interactive wagering service, a telephone at the same location as that equipment may be used to reach the customer service representative.

The user's identity may be checked using social security number information or other identification information with the assistance of subscriber verification facility 40. The services of subscriber verification facility 40 may be used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 may be maintained separately, because the business entities that operate totalisators 30 and transaction processing and subscription management system 24 may be independent. If desired, financial functions related to opening and maintaining user accounts and the like may be handled using computer equipment at another location such as one of financial institutions 38 or at any other suitable location remote from totalisators 30 and system 24. Such financial functions may also be implemented primarily at a totalisator 30 or primarily at the transaction processing and subscription management system 24 if desired.

In another suitable approach, the interactive wagering service may set up a single account for the user at transaction processing and subscription management system 24. The interactive wagering service may have a general wagering account at totalisators 30 for placing wagers. When a user places a wager, the interactive wagering service may send the wager information to totalisator 30 under the general wagering account. After the user places a wager and wins or loses, the interactive wagering service may adjust the user's account at transaction processing and subscription management system 24 to reflect the outcome of the wager.

Users at user television equipment 22, user computer equipment 20, and user telephone equipment 32 may place wagers by providing wagering data and otherwise interacting with transaction processing and subscription management system 24. The interactive wagering service may provide the user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to specify the type of wager in which the user is interested and the desired wager amount. With a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

Figure 2:
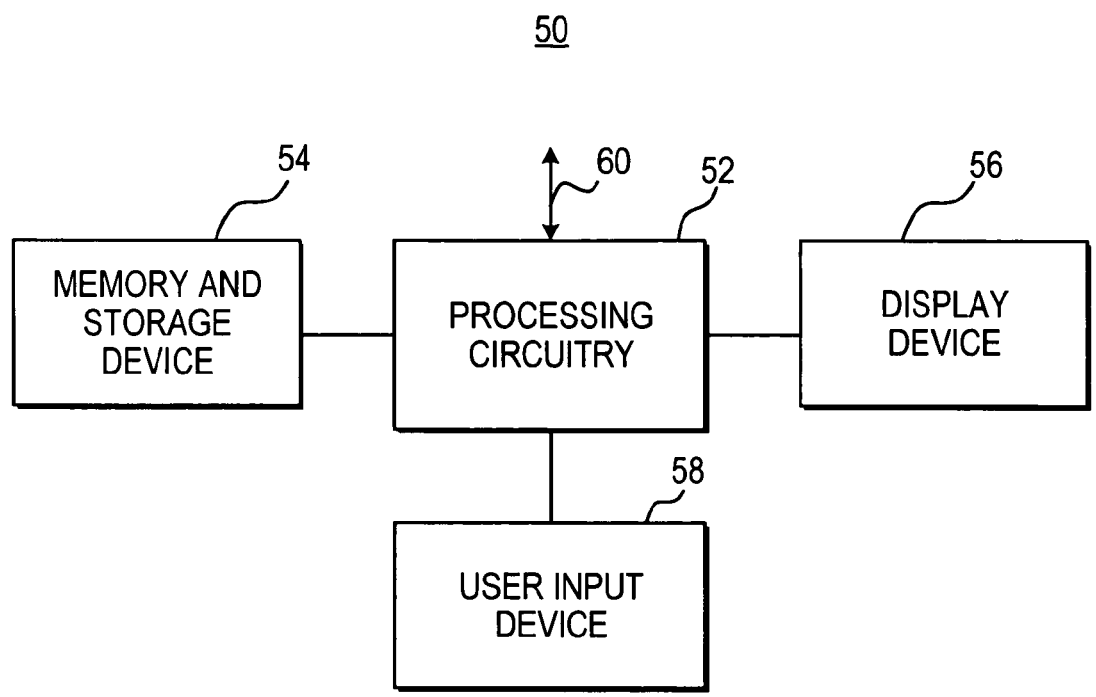
FIG. 2 is a schematic diagram of illustrative user equipment in accordance with one embodiment of the present invention.

User equipment 50 of FIG. 2 shows a generalized schematic diagram of user television equipment 22, user computer equipment 20, and user telephone equipment 32 of FIG. 1. User equipment 50 may include processing circuitry 52, memory and storage device 54, display device 56, and user input device 58.

Processing circuitry 52 and memory and storage device 54 may allow user equipment 50 to support functions such as receiving television programming, recording videos in storage, storing information in memory, accessing interactive services such as an interactive wagering application, television wagering service, interactive television program guide, web browsing and Internet access, and other services such as home shopping, home banking, and video-on-demand services, etc. over communications path 60. Processing circuitry 52 and memory and storage device 54 may be included in a set-top box, satellite receiver, a WebTV box, personal computer, laptop computer, notebook computer, cellular telephone, a handheld computing device such as a personal digital assistant, etc.

Memory and storage device 54 may include a magnetic media recorder (e.g., hard disk drive or the like), memory (e.g. flash memory, EEPROM, or the like), a videocassette recorder, a digital recording device, any other suitable memory and storage device, or any suitable combination thereof. Some or all of memory and storage devices 54 may be located external to the device that contains processing circuitry 52.

Communications path 60 may allow user equipment 50 to communication with the interactive wagering system through communications paths 42, 44c, 44d, 44f-i, 44m, and 44n of FIG. 1, the Internet or other suitable communications paths.

The user may interact with control circuitry 52 using any suitable user input device 58, such as a remote control, keyboard, wireless keyboard, keypad, remote with a touch pad, handheld computer, mouse, trackball, touch pad, handwriting recognition system or any other suitable input device. User input device 58 may allow the user to submit user inputs to processing circuitry 52 through a hard-wired, wireless, or infrared link. User input device 58 may also allow the user to control display device 56.

Display device 56 may be a television, monitor, liquid crystal display (black and white or color), a plasma display, a light-emitting diode display, an active matrix display, or other suitable display device.

Referring back to FIG. 1, the components of system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions, etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, if it is desired to transmit high-quality simulcasts of races from racetracks 12 to video production system 14, analog or digital videos may be transmitted from racetracks 12 to video production system 14 over path 44a using satellite links. Video may be transmitted from studio 16 to video production system 14 over path 44b using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 44c using a modem link (using, for example, a digital subscriber line, a telephone network link, a wireless link, etc.) The modem link may be made over a private network.

A user with a cable modem may connect a personal computer or other such user computer equipment 20 to an associated cable system headend using path 44d. (The headend in such an arrangement would be one of the television distribution facilities 18 shown in FIG. 1.) The user may then receive videos from the headend via cable modem. Videos may be provided to the headend over path 44e using a network link, fiber optic links, cable links, microwave links, satellite links, etc. A user with a set-top box or similar device (shown in FIG. 1 as user television equipment 22) may also receive videos from a cable system headend using a cable modem or other such communications device over path 44f. In addition, a user with user television equipment may receive videos over the Internet or a private network using a telephone-based modem or other such communications device using path 44g. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44f and 44d). For example, videos may be received as part of a dedicated interactive wagering service television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44n.

In one suitable approach, racing data may accompany the racing videos along any of these paths. Racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real-time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44h using a modem link. Path 44h may be a private network path or an Internet path. Path 44h may use telephone lines, digital subscriber lines, ISDN lines, wireless data paths, or any other suitable type of communications links. User television equipment 22 may receive data for the wagering service over communications path 44i, which may be a telephone line, digital subscriber line, ISDN line, or other suitable type of communications path and which may use a private network path or an Internet path, etc.

Data for the wagering service may be provided to users of the interactive wagering application via communications path 44j and paths 44f and 44d. Communications path 44j may be provided over a private network, using the public telephone network, using satellite links, or any other suitable type of links. Data from paths such as path 44j may be routed to paths such as paths 44f and 44d directly by associated television distribution facilities 18, or may be buffered at television distribution facilities 18 if desired. Paths 44f and 44d may include coaxial cable and use of paths 44f and 44d may involve the use of cable modems or the like. If data is provided over path 44j and path 44f or path 44d using an Internet protocol, a web browser or similar software running on user television equipment 22 or user computer equipment 20 may be used to access the data. Such software may be integrated into the interactive wagering application or may be used separately. Software may also be used to view videos and may be used on other platforms (e.g., advanced cellular telephones) if desired.

The communications paths 44k that are used to connect various other components of the system typically do not carry high-bandwidth video signals. Accordingly, paths 44k may be telephone-like paths that are part of the Internet or a private network. Such paths and various other paths 44 may be dedicated connections for security, reliability, and economy.

User telephone equipment 32 may receive information for the wagering service via path 44m. If user telephone equipment 32 is a standard (non-cellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment is a cellular telephone, racing data and other information for the interactive wagering service may be provided to the user by using a cellular wireless connection as part of path 44m. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location. Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touch-tone signals that may be recognized by the interactive voice response system at transaction processing and subscription management system 24, or using any other suitable arrangement). These approaches may be used even if the user receives racing data and other information for the service using a platform other than a telephone-based platform.

Users with user television equipment 22 may interact with the service by sending data (e.g., wager data) to transaction processing and subscription management system 24 using path 44i or using paths 44f and 44j. Users with user computer equipment 20 may send data (e.g., wager data) to transaction processing and subscription management system 24 via path 44h or paths 44d and 44j. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44j and 44f, whereas data may be sent by the user from user television equipment 22 to transaction processing and subscription management system 24 using path 44i, etc. Moreover, the paths used to receive certain video information may be different from those used to receive racing data. For example, user television equipment 22 may receive racing videos using path 44f, but may receive racing data using path 44i. These examples are merely illustrative. Any suitable combination of paths may be used to distribute racing data and other information for the interactive wagering service, any suitable combination of paths may be used to receive videos, and any suitable combination of paths may be used to send data to the wagering service.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports cellular telephone wagering or wagering using handheld computer devices. If desired, system 10 may be configured so that it does not support personal computer wagering, wagering with standard telephones, or wagering with user television equipment. The system may support cellular telephones and/or handheld computing devices such as personal digital assistants, palm-sized computers, etc. in combination with any other suitable platform.

The features of the present invention are sometimes described herein in the context of an interactive wagering application implemented on user television equipment. This is only illustrative. An interactive wagering application implemented on any suitable platform (e.g., user computer equipment, user telephone equipment, or any other suitable platform) may be used to provide such features. In computer arrangements, on-screen options may be selected by clicking on them using a mouse pointer or other pointing arrangement. In set-top box arrangements, on-screen options may be made larger than they appear in computer-based arrangements to accommodate the greater viewing distance from which televisions are typically operated. Options may be selected by highlighting them using remote control arrow keys and by pressing an appropriate key such as an "OK" or enter or select key. In cellular telephone arrangements and handheld computer arrangements, options and information may be displayed using smaller screens than are typically available on personal computer or set-top box arrangements. To accommodate the smaller screen size, options that might otherwise be presented on a single screen may be displayed using multiple screens or layered menus. Options may be selected by highlighting them using navigation keys and pressing an appropriate select button on the cellular telephone or handheld computing device or by using a pen-based interface or the like.

The interactive wagering application may be implemented using application software that runs primarily on user television equipment, user computer equipment, user telephone equipment, or other local platform or using a remote server or other computer that is accessed from a local platform. Arrangements in which interactive wagering services are implemented using software on remote computers that are accessed on-demand from local platforms may be referred to as client-server arrangements. Such client-server arrangements may be used to allow client processes on set-top boxes or other platforms to access server processes running on servers located at cable system headends or other television distribution facilities 18 (FIG. 1) or on remote servers accessed over a communications network. Regardless of the type of system architecture or platform used, the software that supports the interactive wagering service features described herein may be referred to as an interactive wagering application.

In a set-top box environment, the interactive wagering system may allow the user to launch the interactive wagering application by selecting a menu option in an interactive television program guide or other set-top box application or menu. In one suitable approach, the interactive wagering application may be launched automatically whenever the user tunes to a particular channel, for example, a wagering-related television channel. After the user has tuned to this channel, the interactive wagering system may display an interactive icon on the user's television screen that indicates that the interactive wagering application is available. If the user presses an "OK" remote control key, the interactive wagering system may launch the interactive wagering application.

In a computer-based system, the user may access the interactive wagering application by browsing to an Internet web site or a site on a private network.

Interactive wagering systems based on cellular telephones or the like may be launched by selecting an appropriate on-screen menu option presented on the display of the cellular telephone.

Interactive wagering system 10 is shown to be compatible with various forms of user equipment (e.g., computers, telephones, television equipment, etc.). For purposes of brevity and clarity, and not by way of limitation, the interactive wagering application of the present invention is primarily described herein in conjunction with the use of user television equipment 22. It should be understood that this is merely an illustrative embodiment of the present invention, and that any other suitable user equipment or combination of user equipment may be used.

Figure 3:
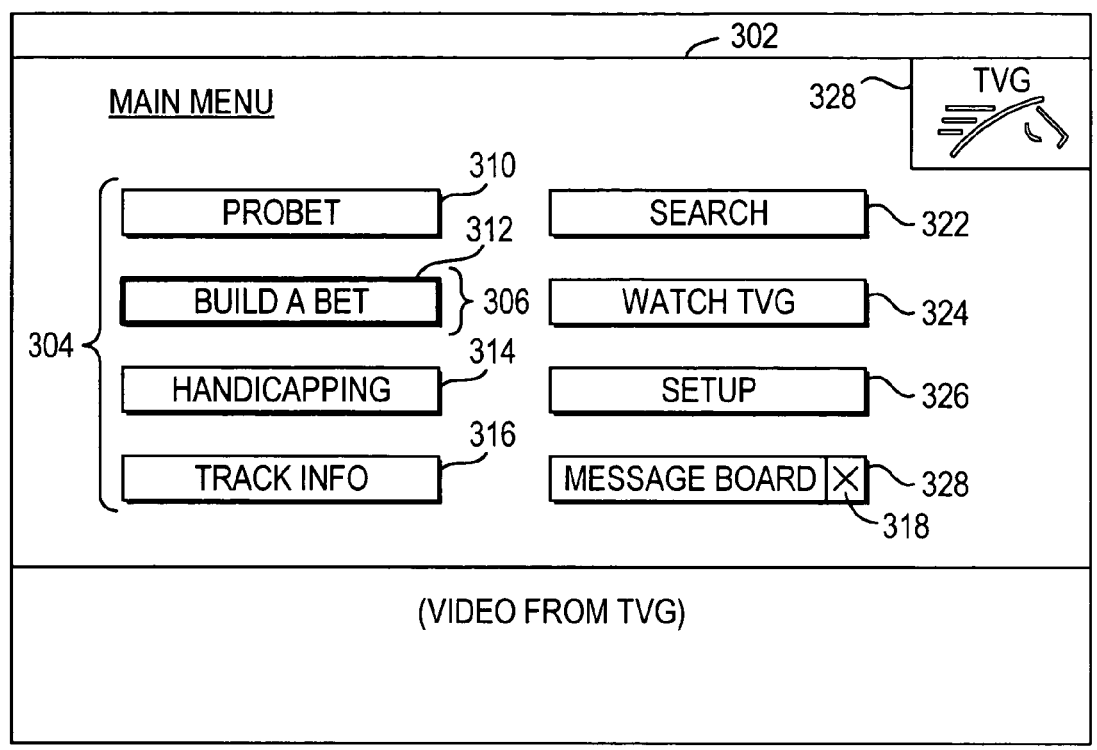
FIG. 3 is an illustrative main menu display screen that may be provided in accordance with one embodiment of the present invention.

An illustrative display screen that may be provided by the interactive wagering application, and particularly by an interactive wagering application implemented using user television equipment 22, is shown in FIG. 3. Screen 300 includes main menu 302 that may be displayed on top of the video for a television wagering channel or any other suitable channel. In another suitable approach, main menu 302 may be presented as a full screen menu that fills the entire screen 300. Menu 302 may include menu options 304 that are selectable by the user using highlight region 306. Main menu options and any other options may be selected by navigating highlight region 306 on top of an item of interest and pressing, for example, an "Enter" or "OK" key on a remote control. The user may navigate highlight region 306 using remote control arrow keys or by any other suitable user input arrangement.

As illustrated, main menu 302 includes "ProBet" option 310, "Build A Bet" option 312, "Handicapping" option 314, "Track Info" option 316, "Search" option 322, "Watch TVG" option 324, "Setup" option 326, and "Message Board" option 328. Main menu 302 may also include any other suitable interactive wagering application option. "ProBet" option 310 and "Build A Bet" option 312 provide the user with the ability to access interfaces for creating wagers. "Build A Bet" may provide a novice interface for the less experienced user that allows a wager to be created. "Build A Bet" may provide the user with the ability to access a sequence of interactive display screens that guide the user through the process of creating a wager. This may be in contrast to "ProBet", which may provide the user with the ability to access an efficient interface where the user may make all of the selections required to create a wager on a single interactive display screen. "Handicapping" option 314 and "Track Info" option 316 may provide the user with the ability to access interactive display screens for displaying handicapping information, race information, track information or any other suitable wagering information. "Search" option 322 may provide the user with the ability to search for future races. "Watch TVG" option 324 may provide the user with the ability to terminate the interactive wagering application and access a television wagering channel or any other suitable channel. "Setup" option 326 may provide the user with the ability to modify his or her wager account, the display options, or any other suitable features of the interactive wagering application. "Message Board" option 328 may provide the user with race relevant information. Option 328 may display icon 318 to indicate that information is available for the user (e.g., information on an upcoming future race). If icon 318 is not displayed, then there may not be any new information available for the user.

Figure 4:
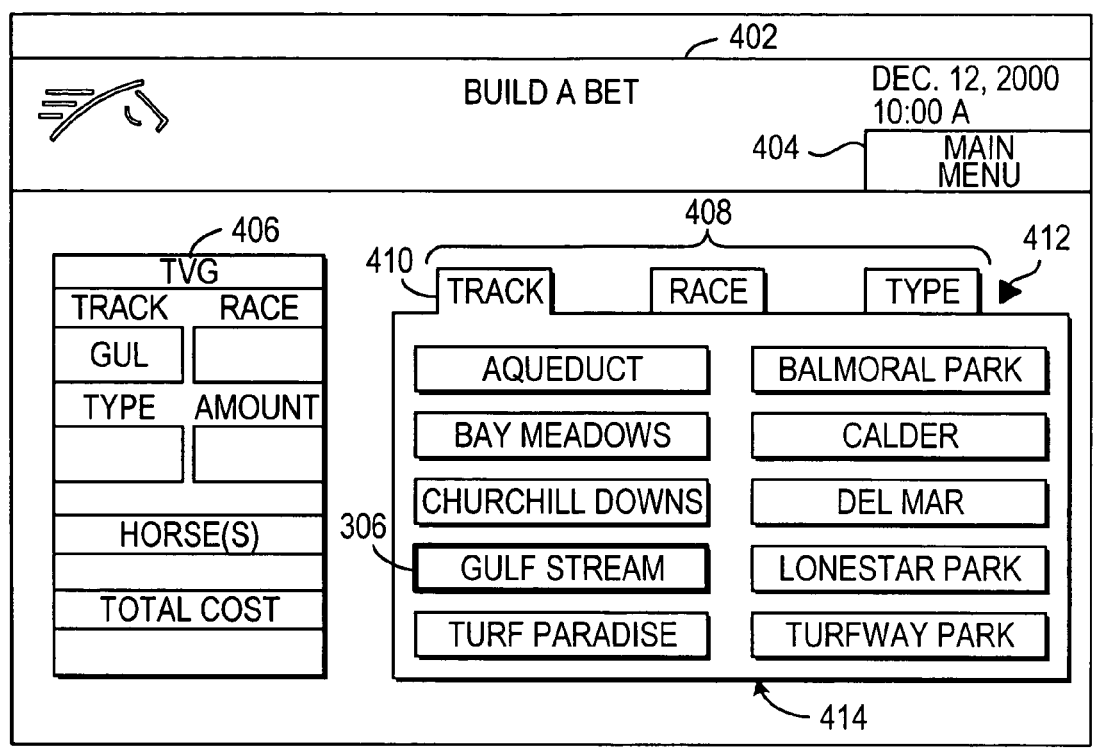
FIG. 4 is an illustrative track selection display screen that may be provided in accordance with one embodiment of the present invention.

If the user selects "Build A Bet" option 312, the interactive wagering application may present screen 400 to the user as illustrated in FIG. 4. Screen 400 includes a status bar 402, which may include an operator icon, the current menu status which is currently "Build A Bet", the current date and time, and a selectable "Main Menu" option 404. If the user selects "Main Menu" option 404, then the interactive wagering application may display main menu 302 as shown in screen 300 of FIG. 3.

Screen 400 of FIG. 4 may also include a ticket window 406 and tab options 408. Ticket window 406 shows a simulated wagering ticket that may be updated as the user navigates highlight region 306 and makes his or her selections. Tab options 408 show the information that is required for the user to create a wager. Track tab 410 is illustrated in the foreground to indicate to the user that the next action to be taken is to select a track for the wager. The user may select a track by selecting one of track options 414. As with other menu selections, within "Build A Bet", the user may select options 414 by navigating highlight region 306 to a desired option and pressing, for example, the select key on a remote control, or by any other suitable method. Although only three tab options 408 are illustrated in screen 400, arrow 412 may be displayed to indicate that other tab options are available.

Figure 5:
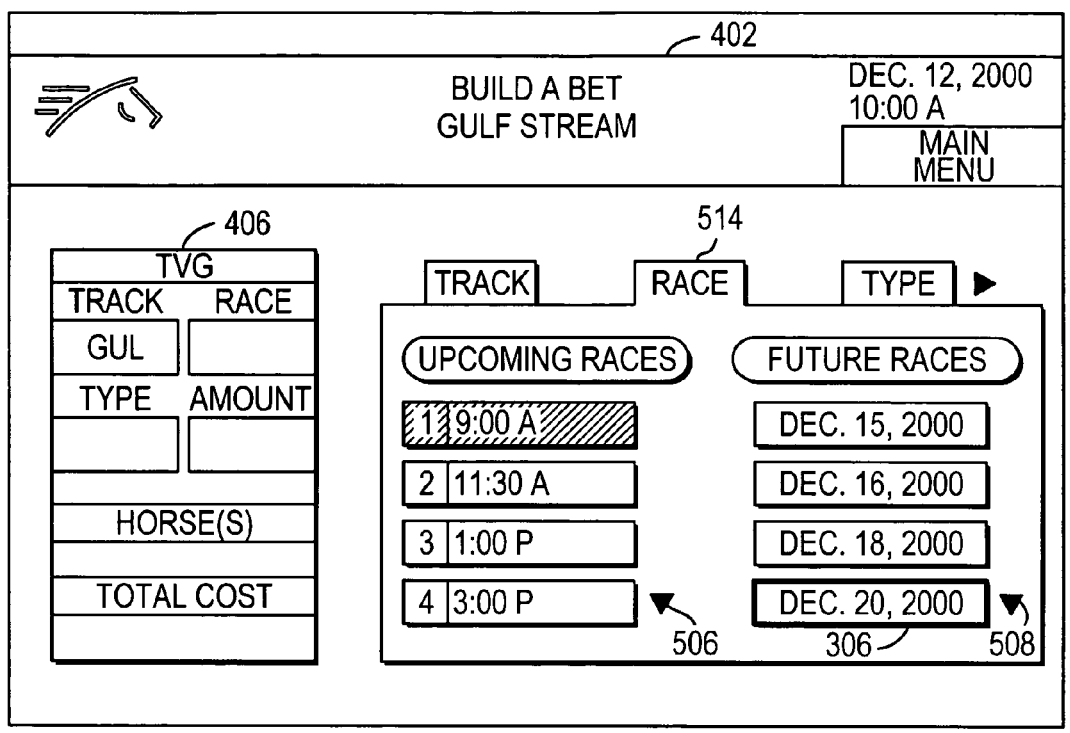
FIG. 5 is an illustrative race selection display screen that may be provided in accordance with one embodiment of the present invention.

Once the user has selected a track from screen 400, the interactive wagering application may display screen 500 as illustrated in FIG. 5. As illustrated, ticket window 406 and status bar 402 show that the user has selected the track "Gulfstream." "GUL", as shown in ticket window 406, is an abbreviation for the track "Gulfstream." Race tab 514 indicates to the user that the next action to be taken is to select a race at the selected track. The user may be provided with two types of race options, "Upcoming Races" and "Future Races." In one suitable embodiment, "Upcoming Races" may be races that will be run that day. In another suitable embodiment, "Upcoming Races" may be races that will be run the following morning or at some other suitable time. "Upcoming Races" may provide the user with the ability to place a wager in a wagering pool that closes shortly before the start of the race. For example, the wagering pool may close at the post time of the race or at any other suitable time just prior to the start of the race. Race "1" under "Upcoming Races" is illustrated in a darkened manner. This may indicate that the race has already been run or that the interactive wagering application has stopped accepting wagers for that race. In another suitable embodiment, race "1" may be displayed in any other suitable manner to indicate that wagering is closed for that race. Down arrow 506 may indicate that additional "Upcoming Races" are available for selection. If the user selects one of the "Upcoming Races", the interactive wagering application may display the selected race number in ticket window 406 and prompt the user to select a wager type.

"Future Races" are races that will be run in the future. For example, "Future Races" may be races that will be run on the following day or within the next week, month, etc. "Future Races" provides the user with the ability to place a wager on a race for which a current wagering pool will close and for which another wagering pool for that race will be open after the current wagering pool closes. Referring to screen 500, under "Future Races" the interactive wagering application may provide the user with the ability to select a race day in the future for placing a wager. Arrow 508 may be displayed to indicate that additional days of "Future Races" are available for selection.

Figure 6A:
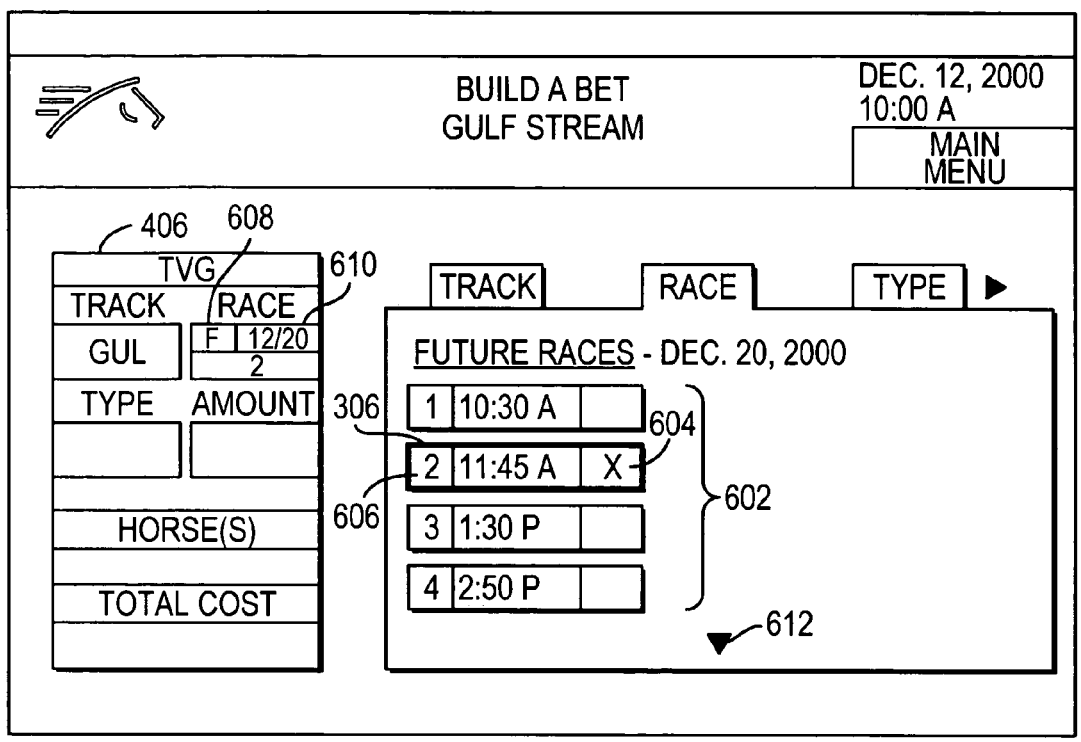
FIGS. 6a-6d are illustrative future race selection display screens that may be provided in accordance with one embodiment of the present invention.

When the user selects a future race date of interest, the interactive wagering application may display screen 600 as illustrated in FIG. 6a. Screen 600 may include future race list 602 for the selected future race date. As illustrated, the user has selected the future race date of Dec. 20, 2000. Future race list 602 may include races that are available to be wagered on for that date. Arrow 612 may be displayed to indicate that other races are available for selection. As illustrated, future race option 606 displays icon 604 to indicate that previous wagering pool information (e.g., the final odds in a previous closed-out pool for that race) or any other suitable race information is available. If icon 604 is not displayed for a particular race, then there may not be any previous wagering pool information available for that race. As illustrated, the interactive wagering application updates ticket window 406 when the user navigates highlight 306. Ticket window 406 may include future race indication 608 and future race date indicator 610 to indicate that the user is currently highlighting a future race that will be run on Dec. 20, 2000.

Figure 6B:
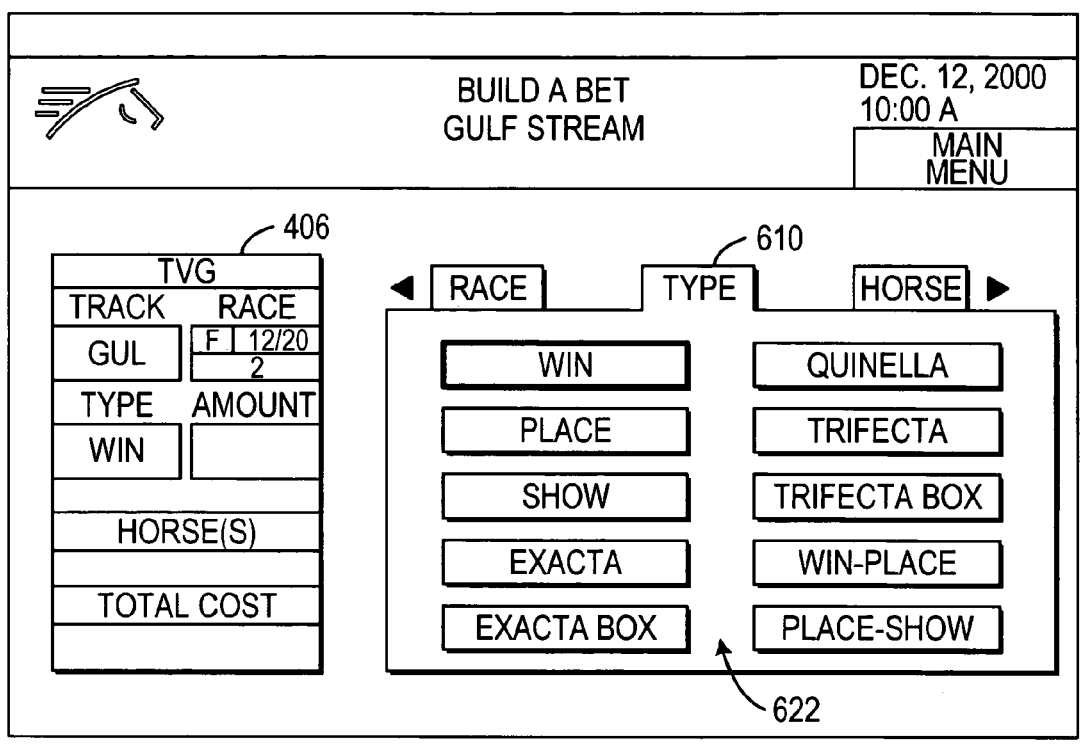

When the user selects a future race, such as future race "2," from display screen 600, the interactive wagering application may display screen 615 as shown in FIG. 6b. As illustrated, ticket window 406 shows that race "2" has been selected. Type tab 610 indicates to the user that the next action to be taken is to select a wager type. Wager list 622 may display the wager types available. Wager list 622 may include "Win," "Place," "Show," "Exacta," "Exacta Box," "Quinella," "Trifecta," "Trifecta Box," "Win-Place," "Win-Place-Show," "Place-Show," or any other suitable wager types.

Figure 6C:
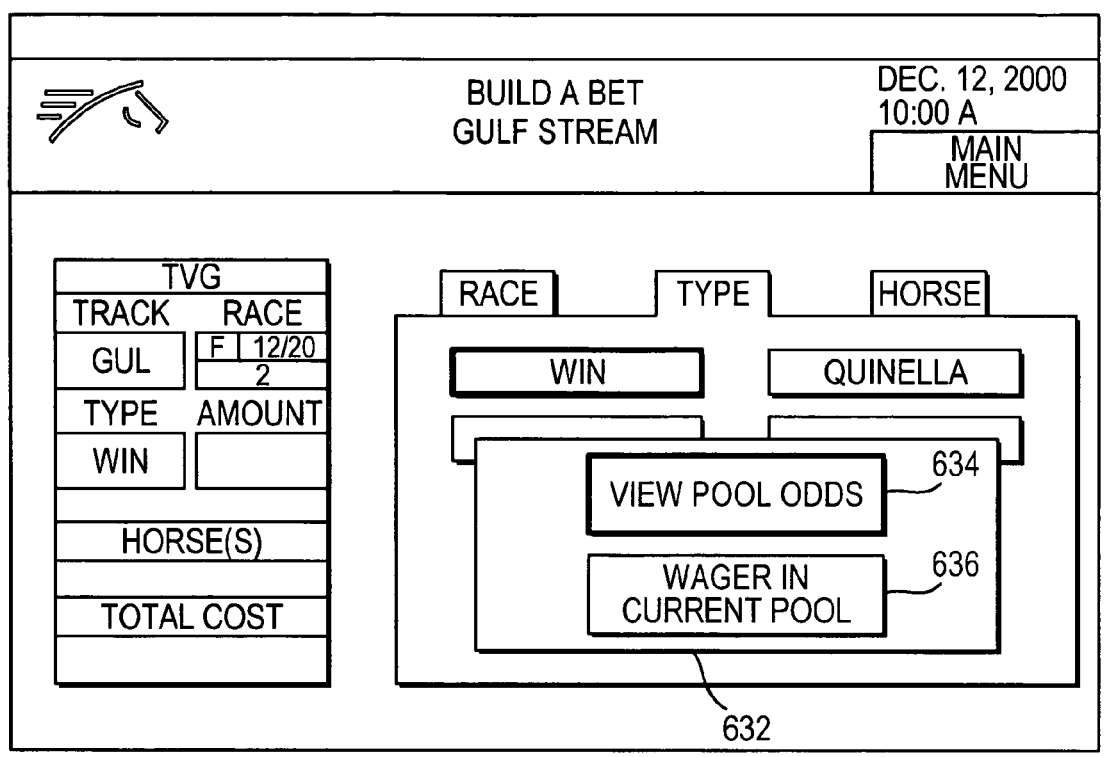

FIG. 6c shows an illustrative display screen 630 that may be displayed by the interactive wagering application. Screen 630 may be displayed when the user has selected a desired wager type from screen 615 of FIG. 6b and when the selected race has previous wagering pool information available. Screen 630 may include overlay menu 632. Overlay menu 632 may provide the user with "View Pool Odds" option 634 and "Wager In Current Pool" option 636. Menu 632 is merely illustrative and may be displayed in any suitable manner and may include any other suitable options. Option 634 may provide the user with the ability to access odds for previous wagering pools for the selected race.

The user may decide to view odds from previous wagering pools before making a wager on a particular horse or horses. The odds that are displayed in response to the user selecting option 634 (FIG. 6c) may be associated with the wager type previously selected by the user. For example, if the user had selected an "Exacta" wager type then the interactive wagering application may display an exacta matrix showing the odds for the different possible runner selections.

Figure 6D:
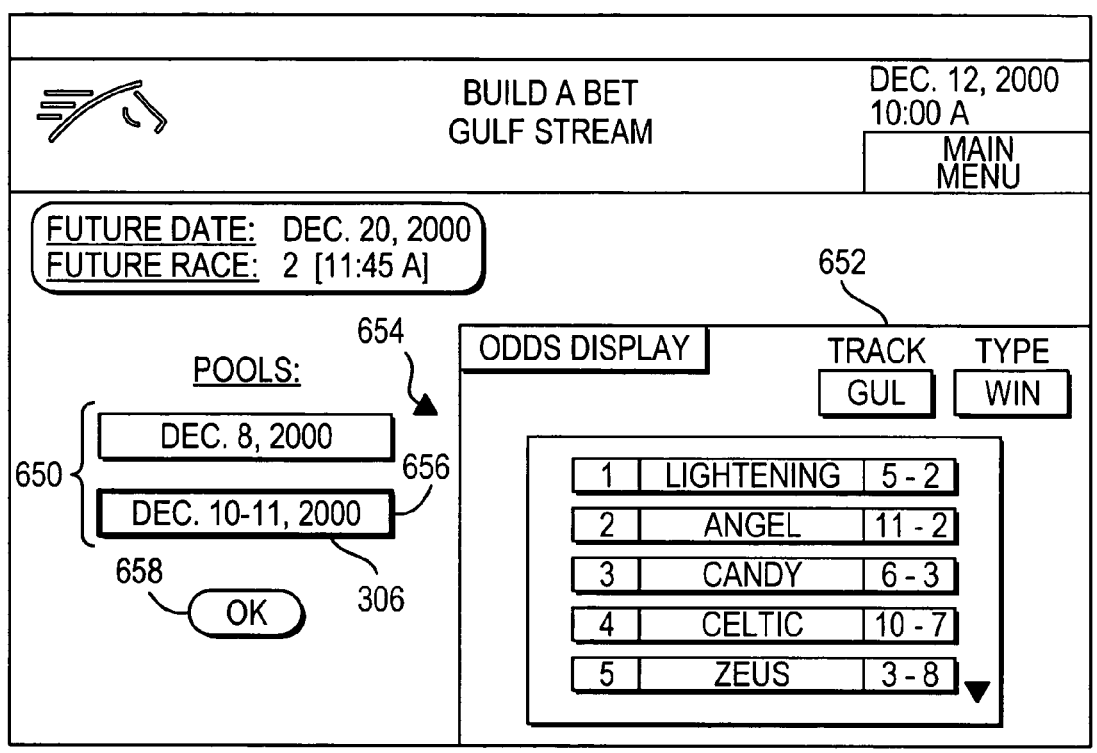

When the user selects option 634 of FIG. 6c, the interactive wagering application may display screen 645 as shown in FIG. 6d. Display screen 645 may include pool log 650. Pool log 650 may include expired wagering pools and may also include current wagering pools. The interactive wagering system may provide wagering pools that are open for various time periods. For example, a wagering pool may be open for a couple of hours, days, or for any other suitable time period. The wagering pools for a particular race may be consecutive (i.e., when one wagering pool closes, another wagering pool opens) or they may overlap each other. In another embodiment, the wagering pools may be separated by a period of time during which no wagering pool is open. The interactive wagering application may display arrow 654 to indicate that additional wagering pools may exist in log 650. When the user navigates highlight region 306, odds display 652 may be updated with the odds for the wagering pool currently highlighted. By placing wagers in more than one wagering pool, the user may be able to hedge his or her wagers by using odds variations that may occur between the wagering pools. If the wagering pool is closed, then the displayed odds may be fixed. If the highlighted wagering pool is open, then the displayed odds may be real-time odds. The user may be able to exit screen 645 and return to display screen 630 of FIG. 6c by selecting, for example, "OK" key 658 or by any other suitable method.

Figure 7:
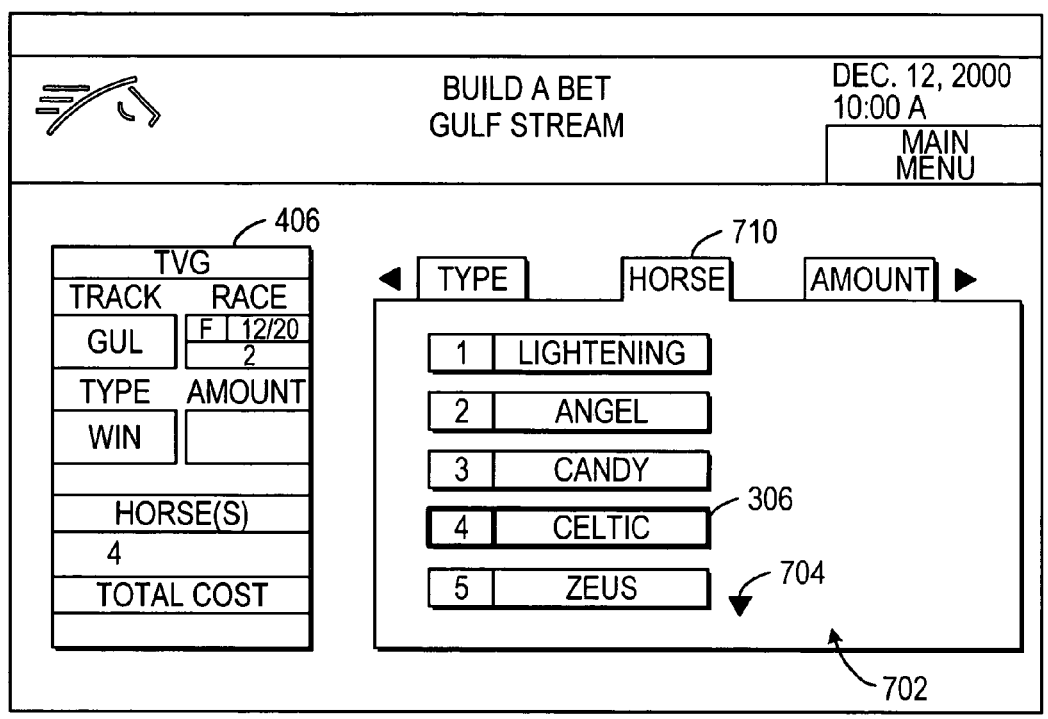
FIG. 7 is an illustrative horse selection display screen that may be provided in accordance with one embodiment of the present invention.

When the user selects wager option 636 of FIG. 6c, the interactive wagering application may display screen 700 as shown in FIG. 7. In another suitable approach, a screen similar to screen 700 may be displayed when the user selects a wager type for a race for which there is no previous wagering pool information. As illustrated, ticket window 406 shows that race "2" has been selected and that the user is currently highlighting horse "4" with highlight region 306. Horse tab 710 indicates to the user that the next action to be taken is to select one or more horses for the wager from horse list 702. Depending on the type of wager chosen by the user, the user may be prompted to select more than one horse. For example, if the user selects an exacta wager, then the user would need to select a first and second horse for the wager. Arrow 704 may be displayed to indicate that there are additional horses that are available to be selected. The user may view the additional horses by navigating highlight region 306 up and down. In another suitable approach, the user may access the additional horses by entering the horse number of one of the additional horses or by any other suitable approach. The horse number may be entered, for example, by pressing number keys on a remote control or by any other suitable method.

Figure 8:
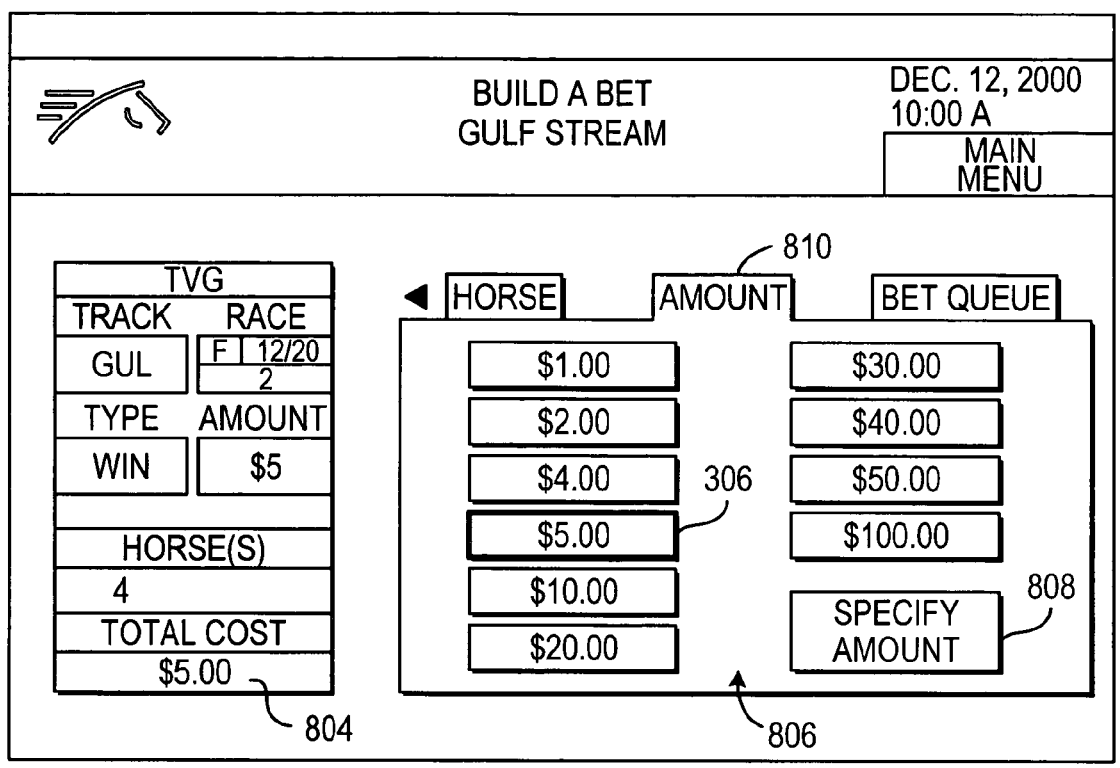
FIG. 8 is an illustrative amount selection display screen that may be provided in accordance with one embodiment of the present invention.

When the user finishes selecting the horse or horses for the wager, the interactive wagering application may display screen 800 as shown in FIG. 8. Display screen 800 may prompt the user to enter a wager amount. This may be indicated by Amount tab 810. As illustrated, ticket window 406 shows that horse "4" has been selected and ticket window 406 may also display the highlighted wager amount and the total wager cost. The user may select the wager amount from a preset list of wagers in wager menu 806 or the user may enter the amount by using "Specify Amount" feature 808. Feature 808 may provide the user with the ability to manually enter a desired wager amount by, for example, pressing number keys or by any other suitable approach. In a "Win" type wager, the amount of the wager and the total cost may be the same as indicated by ticket window 406. If the interactive wagering application charges an additional fee for placing a wager, then the total cost of the wager may not be equal to the wager amount. The total cost may also be greater than the wager amount if the user had selected more than one horse for the "Win" wager. The total cost of the wager may also differ from the wager amount depending on the type of wager selected. For example, in an exacta box wager, the total cost of the wager is double the wager amount because an exacta box wager is actually two exacta wagers.

Figure 9:
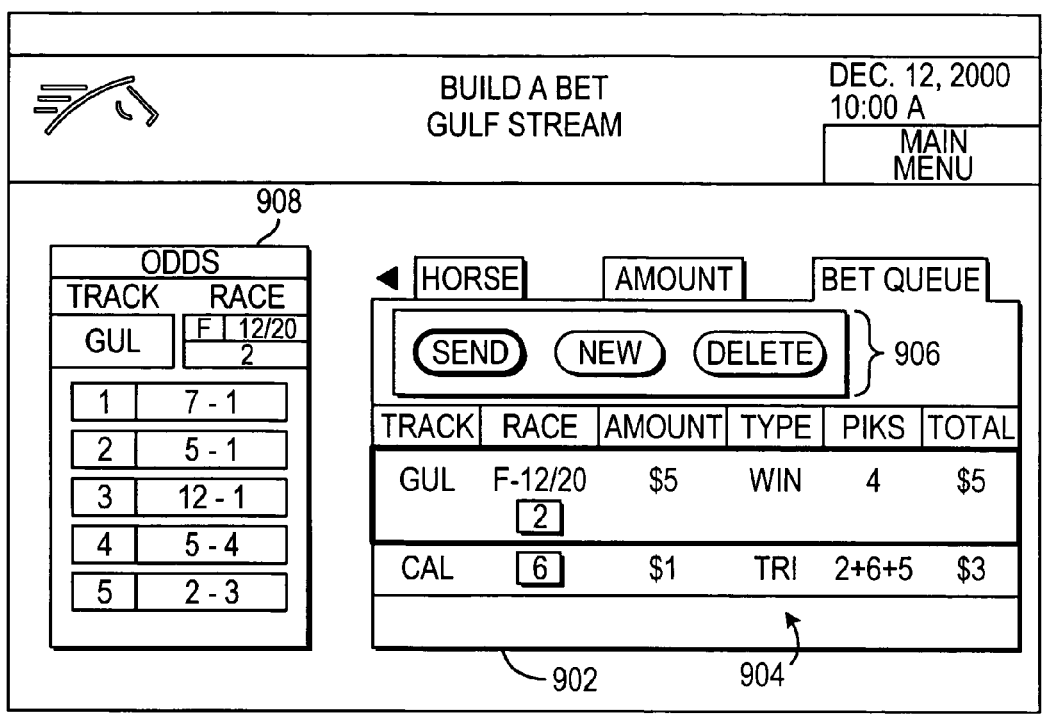
FIG. 9 is an illustrative bet queue display screen that may be provided in accordance with one embodiment of the present invention.

When the user selects or enters a desired wager amount, the interactive wagering application may display screen 900 as shown in FIG. 9. Screen 900 shows an illustrative "Bet Queue" screen that displays wager information to the user. Screen 900 may include a wagering summary window 902. Summary window 902 may include a bet queue 904 and action selections menu 906. Bet queue 904 may allow the user to review his or her wagers before submitting them. If the user decides to change a wager, the user may navigate to any of the previous wager screens by using highlight 306 or by any other suitable method. The user may also select the "New" option and "Delete" option from menu 906 to create a new wager or delete a wager from queue 904, respectively. Screen 900 may also include an "Odds" window 908. Odds window 908 may provide the user with the ability to monitor the odds for each horse to win for any race displayed on queue 904. The user, once satisfied with his or her wagering selections, may use "Send" key 910 from menu 906 to submit one or more wagers to transaction processing and subscription management system 24 or to any other suitable system or facility for submission to totalisators 30.

It will be understood that the series of "Build A Bet" display screens 300-900 are exemplary and that additional screens may be added and that some of the screens may be omitted or modified. For example, if the interactive wagering application is configured for more than one user, the interactive wagering application may display a player identification screen or an overlay prompting the user to enter or select his or her name. The interactive wagering application may also prompt the user to enter a password as a security measure.

Figure 10:
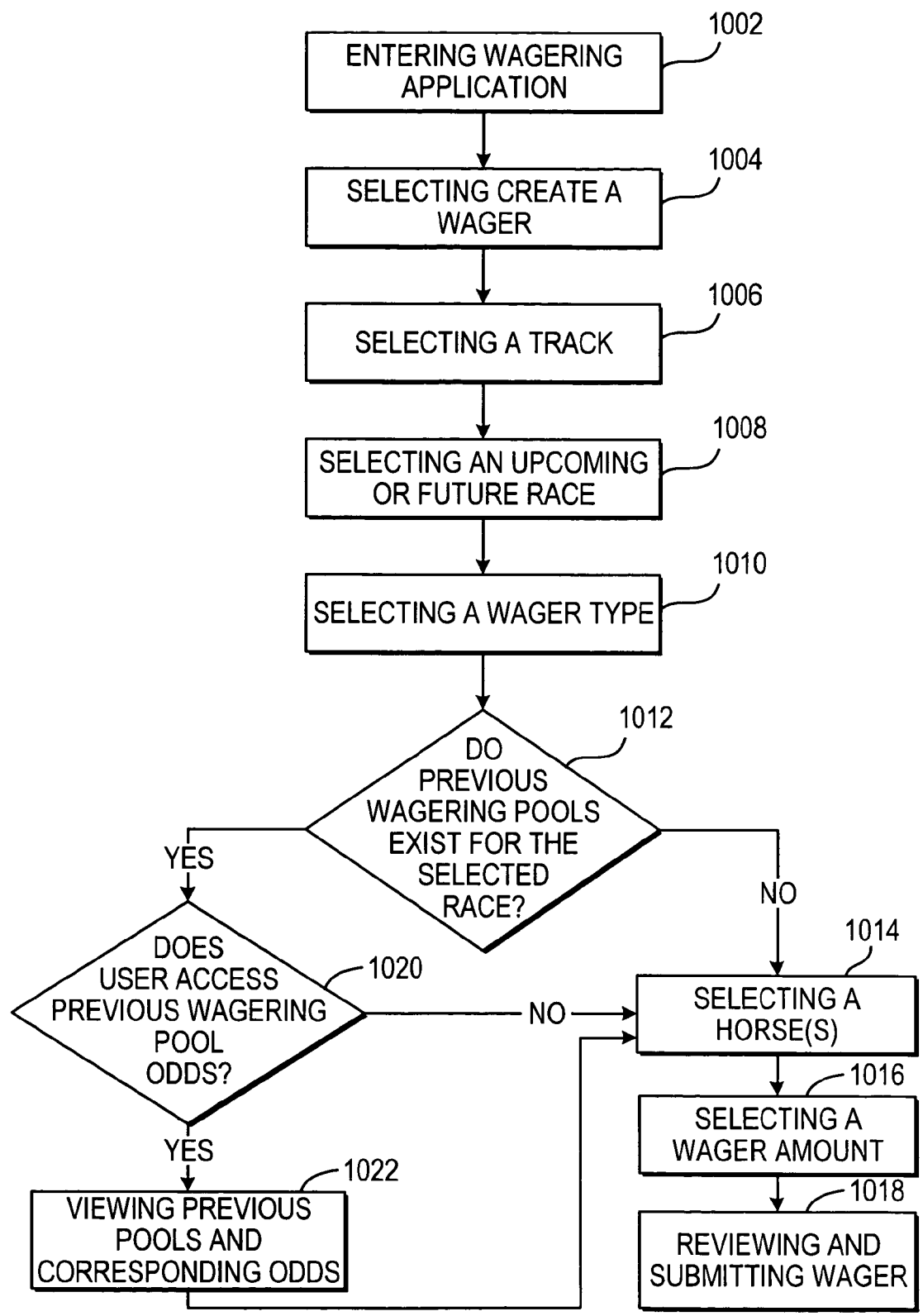
FIG. 10 is a flowchart of illustrative steps involved in placing a wager on a future race in accordance with one embodiment of the present invention.

FIG. 10 is a flowchart of illustrative steps that may be involved in placing a wager on a future race. At step 1002, the user may enter the main menu of an interactive wagering application such as main menu 302 of FIG. 3. At step 1004, the user may select an option to create a wager, such as "Build A Bet" option 312 from main menu display screen 300 to begin the process of creating a wager. At step 1006 the user may select a racetrack. The user may select a racetrack from a list of racetracks (e.g., racetrack options 414 of FIG. 4). The user may then select an upcoming or future race in which he or she is interested in wagering on at step 1008. The user may select the date of the future race from the "Future Races" listing of FIG. 5. Once a race has been specified, the user may then select a wager type at step 1010. The user may select, for example, a place wager from a wager selection screen such as screen 615 of FIG. 6b. At step 1012, the interactive wagering application may check to see if previous wagering pools have been run for this race. If no prior wagering pool information is available for the selected race, the interactive wagering application may display a horse selection screen such as screen 700 of FIG. 7. At step 1014, the user may select a desired horse. After selecting a horse, the interactive wagering application may display a wagering amount screen, such as screen 800 of FIG. 8. At step 1016, the user may submit a wager amount on the race of interest using the wagering amount screen. When a user has finished making all of his or her selections the user may, at step 1018, review the selections and then submit his or her race wagers based on those selections. The user may review and submit the race wagers using display screen 900 of FIG. 9.

At step 1020, if previous wagering pools exist for the selected race, then the interactive wagering application may display a prompt that provides the user with the ability to access the previous wagering pool information. If the user chooses not to view the previous wagering pool information, the interactive wagering application may direct the user back to step 1014 which is described above. Alternatively, if the user decides to view previous wagering pool information (e.g., odds pool information, etc.) at step 1020 the interactive wagering application may display a previous wagering pool information display screen such as display screen 645 of FIG. 6d. At step 1022, the user may view the displayed previous wagering pool information. When the user has finished viewing the information, the user may continue with the wagering process by, for example, selecting "OK" button 658 in display 645 of FIG. 6d.

Figure 11:
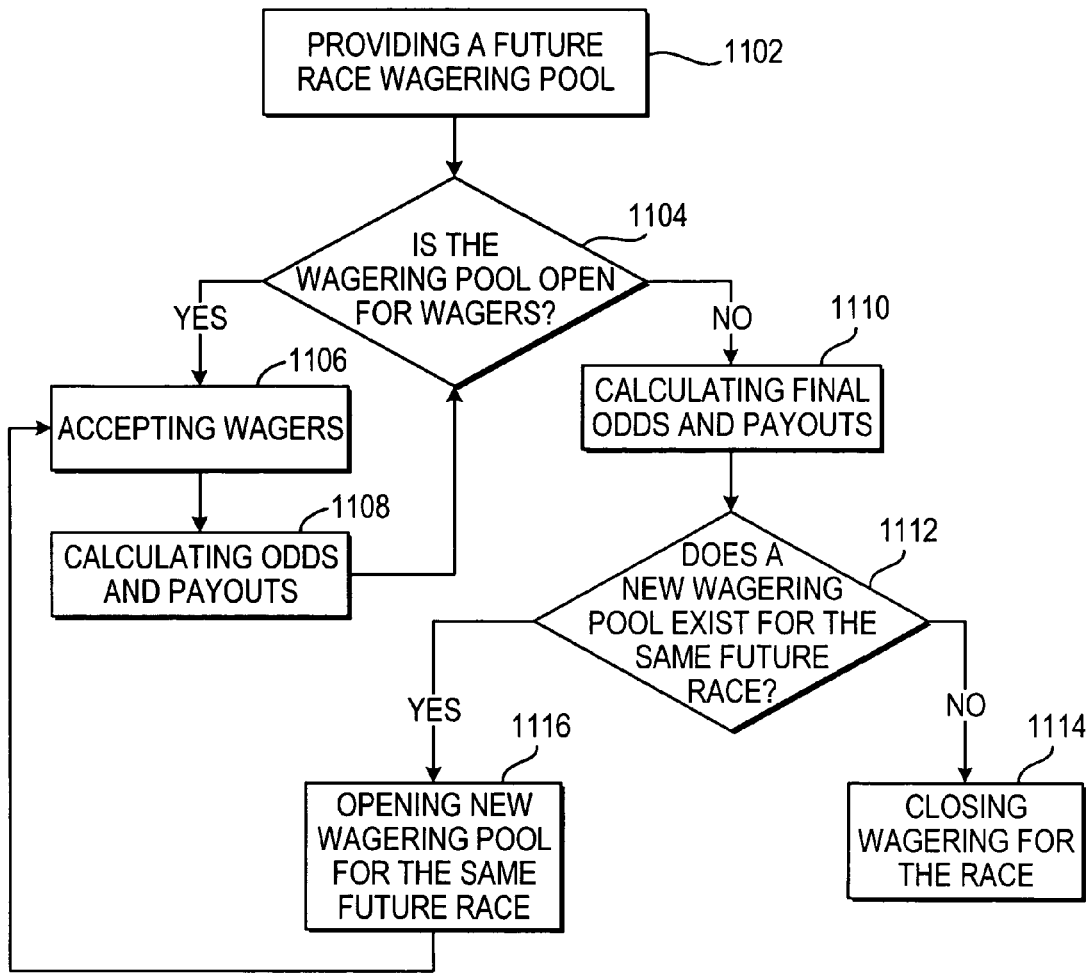
FIG. 11 is a flowchart of illustrative steps involved in providing future race wagering pools in accordance with one embodiment of the present invention.

FIG. 11 is a flowchart of illustrative steps involved in providing future race wagering pools. At step 1102, the interactive wagering system may provide an open wagering pool in which the user may place a wager for a future race. The wagering pool for the future race may remain open as long as the time period for that particular wagering pool has not expired. The time period of the wagering pool may be predetermined according to a predetermined schedule, may be determined by an operator of the interactive wagering system, or may be determined by any other suitable approach. The status of the wagering pool is checked at step 1104. If the wagering pool is open for wagers, the interactive wagering system may continue to accept wagers at step 1106 and calculate the current odds and payouts for the race at step 1108. The interactive wagering system may continue to loop back to step 1104 and accept and update odds at steps 1106 and 1108, respectively, as long as the wagering pool is open.

If it is determined at step 1104 that the wagering pool is no longer open, then the interactive wagering system may not accept any more wagers and the final odds and payouts are calculated at step 1110 for that particular wagering pool. At step 1112, the interactive wagering system may determine whether another wagering pool for the same future race exists. For purposes of clarity and not by way of limitation, the interactive wagering system determines whether a new wagering pool exists after the closing of the previous wagering pool. The interactive wagering system may determine whether a new wagering pool exists immediately following the closing of the previous wagering pool, while the previous wagering pool is open, at some time after the previous wagering pool closes, or at any other suitable times. If a new wagering pool is determined to exist, the interactive wagering system opens the new wagering pool at step 1116. The interactive wagering system may then loop the new wagering pool opened at step 1116 to steps 1106 and 1108 to accept wagers and calculate the odds and payouts, respectively. The new wagering pool may continue to loop through steps 1106 and 1108 until it is determined, at step 1104, that the new wagering pool has closed. When the new wagering pool has closed, the final odds and payouts may be calculated at step 1110. At step 1112, the interactive wagering system may determine if another wagering pool exists for that particular race. If no more wagering pools are available for the future race, the interactive wagering system may close the wagering for that particular future race at step 1114.

In another embodiment of the present invention, the user may be notified of available future races that may be of interest to the user. A user profile may be maintained by the interactive wagering system in order to match future events with the user's interests. The interactive wagering system may also notify the user of future races without using the user profile. The interactive wagering application may automatically post or display the future race information to the user. The interactive wagering application may notify the user of new information postings by displaying an indication icon such as icon 318 on message board option 328 of FIG. 3. FIG. 12 shows an illustrative message board display screen 1200 that the interactive wagering application may display to provide the user with future race information. The message board may also be used to display any other suitable race information. The user may access the message board by selecting, for example, "Message Board" option 328 as shown in main menu display screen 300 of FIG. 3. Display 1200 may include available future races 1202. Future races 1202 may include information such as racetrack 1204 to indicate the location of the race, date 1206 to indicate the scheduled day of the race, race number 1208 to indicate the race on the indicated track, and wagering pool information 1210 to provide the user with the wagering pool's active time period for placing a wager and relevant prior pool information for the indicated race.

Wagering pool information 1210 may include open display 1212, close display 1214, and previous pools display 1216. Open display 1212 may indicate the opening date and time of a wagering pool for a future race. Close display 1214 may indicate the closing date and time of a wagering pool for a future race. Previous pools display 1216 may indicate that prior pool information (e.g., odds pool information, etc.) is available for the future race. If the user decides to select a future race to wager on and the racing event displays "Available" in previous pools display 1216, the interactive wagering application may provide the user with the ability to access odds information on previous wagering pools for that future racing event.

When the user selects a race of interest from the available future races 1202 using, for example, highlight region 306, the interactive wagering application may present the user with interfaces similar to those displayed in FIGS. 6b-9. For example, the interactive wagering application may present the user with wagering interfaces that prompt the user to select a wager type (FIG. 6b), prompt the user to view previous pool odds for the future race (FIG. 6c), prompt the user to select a horse (FIG. 7), and prompt the user to select a wager (FIG. 8).

Figure 13:
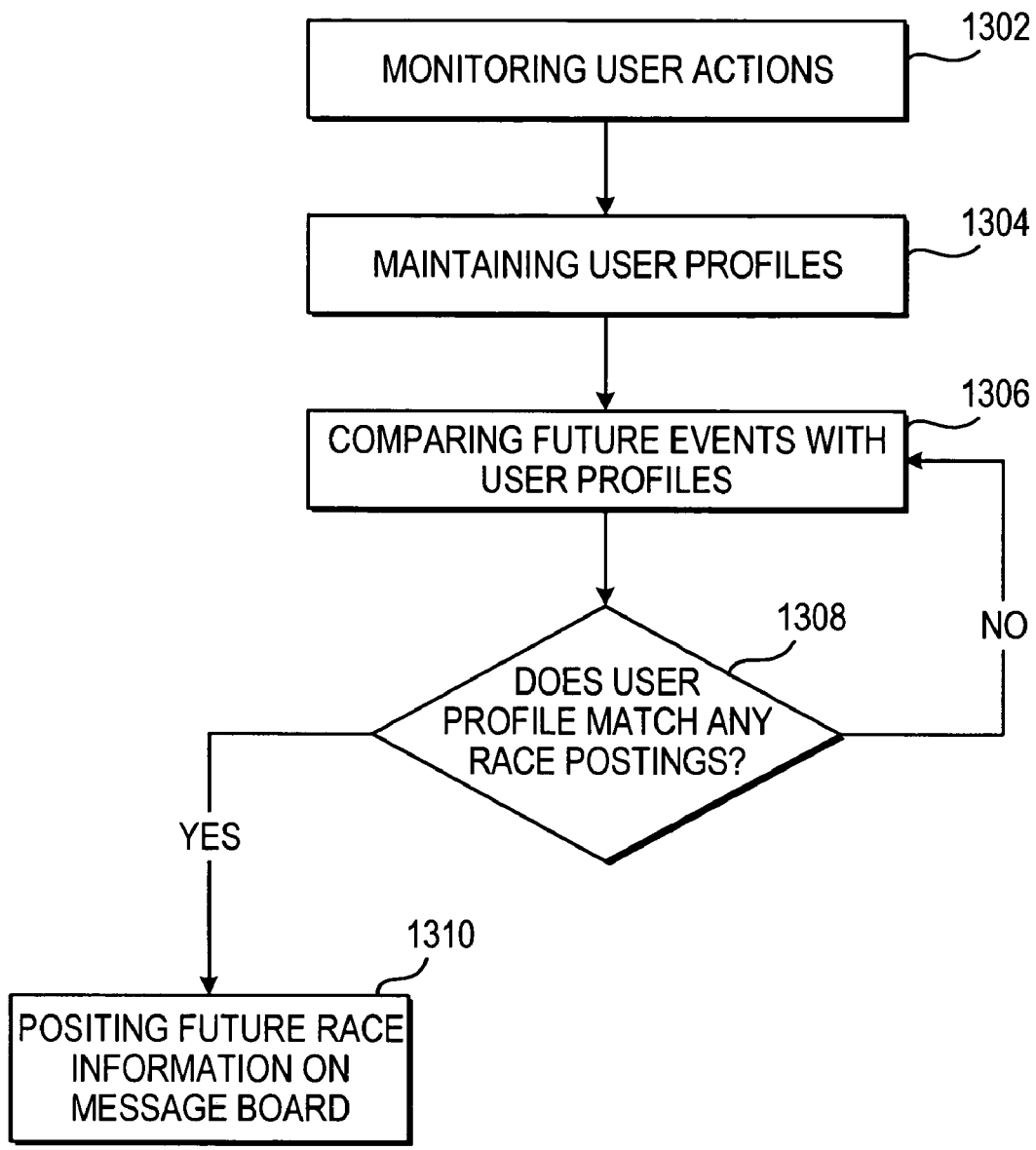
FIG. 13 is a flowchart of illustrative steps involved in associating future race information with a user in accordance with one embodiment of the present invention.

FIG. 13 is a flowchart of illustrative steps that may be involved in associating future races with the user for the purpose of notifying the user of relevant race information. The future races may be associated with the user based on the user's past wagers on events, past orders for races as pay-per-view events, or based on any other suitable method. The interactive wagering application may monitor the user activity at step 1302. At step 1304, the interactive wagering application may create and store (e.g., on memory and storage device 54 of FIG. 2) a user profile for the purpose of comparing future races with monitored user interests at step 1306. When a future race becomes available for wagering, the interactive wagering application may check the user profile to determine whether a match exists with the available race at step 1308. If no match exists, then the interactive wagering application may not post the future race information to the user and continue to monitor and compare the future events with the user profile. If future races match interests or prior actions stored in the user profile, the interactive wagering application may post the future races to the user, for example, on the user's message board (as shown in display screen 1200 of FIG. 12) at step 1310. The user may access his or her message board to retrieve future race information and determine whether he or she is interested in participating in the future race wagering pool.

In yet another embodiment of the present invention, the interactive wagering application may provide the user with the ability to search for future races by using, for example, search option 322 of FIG. 3. The interactive wagering application may provide the user with the ability to search for user-specified criteria. Such search criteria may include a race name (e.g., the Kentucky Derby), a future race date or date range, a horse name, a track name, and/or a jockey name. For example, a user may search for future races on a specific track falling between a specified future date range by indicating the track and the date information, respectively, in appropriate search fields. The interactive wagering application may also provide the user with the ability to search for any other suitable search criteria. Upon the completion of a search, the interactive wagering application may display a list of search results. Illustrative search feature screens are described, for example, in commonly-assigned Thomas et al. U.S. patent application Ser. No. 09/796,097, filed Feb. 28, 2001, which is hereby incorporated by reference herein in its entirety.

Thus, systems and methods are provided for placing parimutuel wagers on future events. One skilled in the art will appreciate that the present invention can be practiced by other than the described embodiments, which are presented for purposes of illustration and not of limitation, and the present invention is limited only by the claims which follow.

What is claimed is:

1. A method for wagering on a future race using an interactive wagering system, comprising:
providing a user with the ability to place a wager in a first parimutuel wagering pool for the future race;
providing the user with the ability to select a wager type for the wager from a plurality of different wager types; and
using the interactive wagering system to provide a second parimutuel wagering pool for the future race, wherein (a) the second parimutuel wagering pool is separate from the first parimutuel wagering pool whereby odds of the first parimutuel are calculated using only wagers placed in the first parimutuel wagering pool and odds of the second parimutuel wagering pool are calculated using only wagers placed in the second parimutuel wagering pool, (b) the first and second parimutuel wagering pools accept wagers of the same selected type, and (c) the second parimutuel wagering pool closes after the first parimutuel wagering pool closes.

2. The method defined in claim 1 further comprising providing the user with the ability to place a wager in the second parimutuel wagering pool.

3. The method defined in claim 1 wherein the second parimutuel wagering pool is open while the first parimutuel wagering pool is open.

4. The method defined in claim 1 wherein the second parimutuel wagering pool opens when the first parimutuel wagering pool closes.

5. The method defined in claim 1 wherein the second parimutuel wagering pool opens at some time after the first parimutuel wagering pool closes.

6. The method defined in claim 1 wherein the odds and payouts for the first parimutuel wagering pool are being calculated while the first parimutuel wagering pool is open and wherein the odds and payouts for the second parimutuel wagering pool are being calculated while the second parimutuel wagering pool is open.

7. The method defined in claim 6 wherein the odds and payouts for the first parimutuel wagering pool become fixed when the first parimutuel wagering pool closes and wherein the odds and payouts for the second parimutuel wagering pool become fixed when the second parimutuel wagering pool closes.

8. The method defined in claim 1 further comprising providing the user with the ability to access wagering pool information.

9. The method defined in claim 8 wherein the wagering pool information for a closed wagering pool includes fixed odds and payouts for the future race.

10. The method defined in claim 8 wherein the wagering pool information for an open wagering pool includes current odds and payouts for the future race.

11. The method defined in claim 1 further comprising notifying the user of future race events by displaying a message.

12. The method defined in claim 1 further comprising monitoring user actions to create a user profile.

13. The method defined in claim 12 further comprising:
   finding future race events that may be of interest to the user based on the user profile; and
   notifying the user of the future race events that may be of interest.

14. The method defined in claim 13 further comprising notifying the user of the future race events that may be of interest by displaying a message.

15. The method defined in claim 13 further comprising adding the future race events to a list.

16. The method defined in claim 15 further comprising providing the user with the ability to access the list.

17. A system for wagering on a future race using an interactive wagering system, comprising:
   at least one totalisator configured to run a first parimutuel wagering pool for the future race and a second parimutuel wagering pool for the future race, wherein (a) the second parimutuel wagering pool is separate from the first parimutuel wagering pool whereby odds of the first parimutuel are calculated using only wagers placed in the first parimutuel wagering pool and odds of the second parimutuel wagering pool are calculated using only wagers placed in the second parimutuel wagering pool, (b) the first and second parimutuel wagering pools accept wagers of the same selected type, and (c) the second parimutuel wagering pool closes after the first parimutuel wagering pool closes; and
   user equipment configured to:
   provide the user with the ability to place a wager in the first parimutuel wagering pool for the future race; and
   provide the user with the ability to select a wager type for the wager from a plurality of different wager types.

18. The system defined in claim 17 wherein the user equipment is further configured to provide the user with the ability to place a wager in the second parimutuel wagering pool.

19. The system defined in claim 17 wherein the second parimutuel wagering pool is open while the first parimutuel wagering pool is open.

20. The system defined in claim 17 wherein the second parimutuel wagering pool opens when the first parimutuel wagering pool closes.

21. The system defined in claim 17 wherein the second parimutuel wagering pool opens at some time after the first parimutuel wagering pool closes.

22. The system defined in claim 17 wherein the at least one totalisator is configured to (a) calculate the odds and payouts for the first parimutuel wagering pool while the first parimutuel wagering pool is open and (b) calculate the odds and payouts for the second parimutuel wagering pool while the second parimutuel wagering pool is open.

23. The system defined in claim 22 wherein the at least one totalisator is further configured to (a) fix the odds and payouts for the first parimutuel wagering pool when the first parimutuel wagering pool closes and (b) fix the odds and payouts for the second parimutuel wagering pool when the second parimutuel wagering pool closes.

24. The system defined in claim 17 wherein the user equipment is further configured to provide the user with the ability to access wagering pool information.

25. The system defined in claim 24 wherein the wagering pool information for a closed wagering pool includes fixed odds and payouts for the future race.

26. The system defined in claim 24 wherein the wagering pool information for an open wagering pool includes current odds and payouts for the future race.

27. The system defined in claim 17 wherein the user equipment is configured to display a message to notify the user of future race events.

28. The system defined in claim 17 wherein the user equipment is configured to monitor user actions to create a user profile.

29. The system defined in claim 28 wherein the user equipment is further configured to:
   find future race events that may be of interest to the user based on the user profile; and
   notify the user of the future race events that may be of interest.

30. The system defined in claim 29 wherein the user equipment is further configured to display a message to notify the user of available future race events that may be of interest.

31. The system defined in claim 29 wherein the user equipment is further configured to maintain and add the future race events that may be of interest to a list.

32. The system defined in claim 31 wherein the user equipment is further configured to provide the user with the ability to access the list.

* * * * *